H. ANDREWS.
SCRAPER.
No. 40,317. Patented Oct 20. 1863.
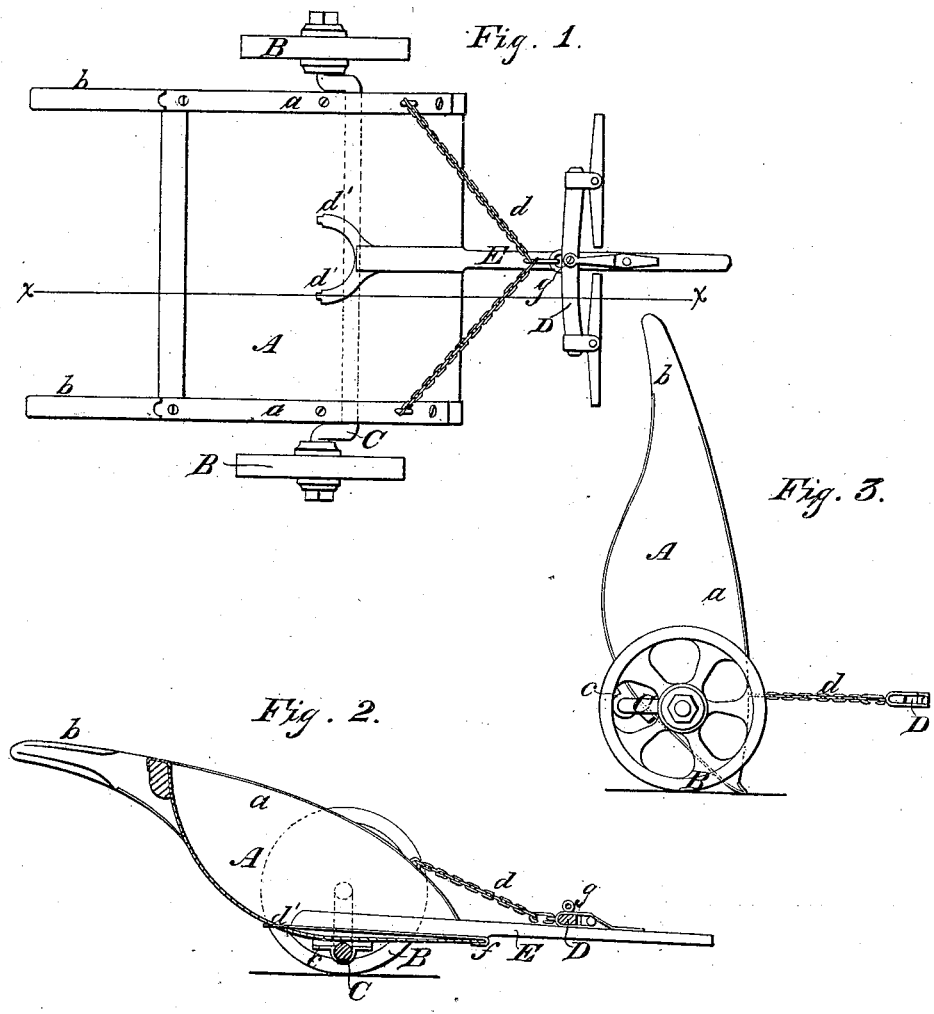

UNITED STATES PATENT OFFICE.

HORATIO ANDREWS, OF FREDONIA, NEW YORK.

IMPROVEMENT IN SCRAPERS.

Specification forming part of Letters Patent No. 40,317, dated October 20, 1863.

*To all whom it may concern:*

Be it known that I, HORATIO ANDREWS, of Fredonia, in the county of Chautauqua and State of New York, have invented a new and Improved Scraper; and I do hereby declare that the following is a full, clear, and exact description of the same, reference being had to the accompanying drawings, forming a part of this specification, in which—

Figure 1 represents a plan or top view of my invention. Fig. 2 is a longitudinal vertical section of the same, taken in the plane indicated by the line $x\ x$, Fig. 1. Fig. 3 shows a side elevation of the same in the act of unloading.

Similar letters of reference in both views indicate corresponding parts.

The object of this invention is to produce a scraper which is simple, light, easily handled, which can be used on rough and stony ground as well as on level and smooth ground, and which can be readily loaded and unloaded.

The nature of my invention and its peculiar advantages will be readily understood by referring to the following description:

A represents a scoop-shaped box, made of sheet metal or any other suitable material, and provided with sides $a$, made of wood or any other material suitable for the purpose. The sheet-metal bottom is curved and fastened to the lower edges of the side pieces, and these side pieces extend over the rear edge of the box to form handles $b$.

The box A is attached, by means of journal-boxes $e$, to a crank-axle, C, the ends of which have their bearings in wheels B, as clearly shown in Fig. 1 of the drawings. The axle C is bent twice at right angles close on the insides of the wheels, thus producing a crank sufficient long to extend under the entire width of the box A. The journal-boxes $c$ are attached to the crank part of the axle, and if the box is brought in the position shown in Fig. 3 for the purpose of discharging its load it is not necessary to lift the wheels from the ground. The box can be raised up by the handles and the axle C will rotate in the journals, thus allowing the wheels to bear on the ground continually. The operation of unloading the scraper is thereby considerably facilitated.

The scraper when in use is drawn along by a chain, $d$, the ends of which are secured to the top edges of the sides $a$ at such points that the front or scraping edge of the box can be readily depressed on the ground when it is desirable, or raised in order to clear a stone or other obstruction without interfering with the forward motion of the scraper. This chain also allows of pushing the scraper sidewise as far as the chain will allow, and such spots can be reached over which the draft animals cannot travel. Said chain is used to draw the scraper along, whether the same be loaded or unloaded.

In order to hitch the draft animals to the chain, a double-tree, D, is suspended from the same, and to this double-tree two whiffletrees are attached in the ordinary manner.

When the scraper is not used, and for the purpose of facilitating the operation of moving the same from one place to another, a draft-pole, E, is provided, the forked ends $d'$ of which can be inserted into holes in the bottom of the box A, and a hook, $f$, attached to its under side, catches over the front edge of the scraper. After the draft-pole has been thus adjusted in its place, the double-tree D is attached to the same by a bolt, $g$, and the device is ready to be drawn to any place. On arriving at the place of business the draft-pole is removed and the scraper is ready to be used, as above described.

What I claim as new, and desire to secure by Letters Patent, is—

1. The journal-boxes $e$ at the bottom of the box A, in combination with the crank-axle C and wheels B, constructed and operating in the manner and for the purpose substantially as set forth.

2. The employment or use of the draft-pole E with a forked end, $d'$, and hook $f$, in combination with the box A, chain $d$, and double-tree D, all arranged and operating as and for the purpose specified.

HORATIO ANDREWS.

Witnesses:
JNO. L. RUSSELL,
A. H. JUDSON.